(No Model.) 2 Sheets—Sheet 2.

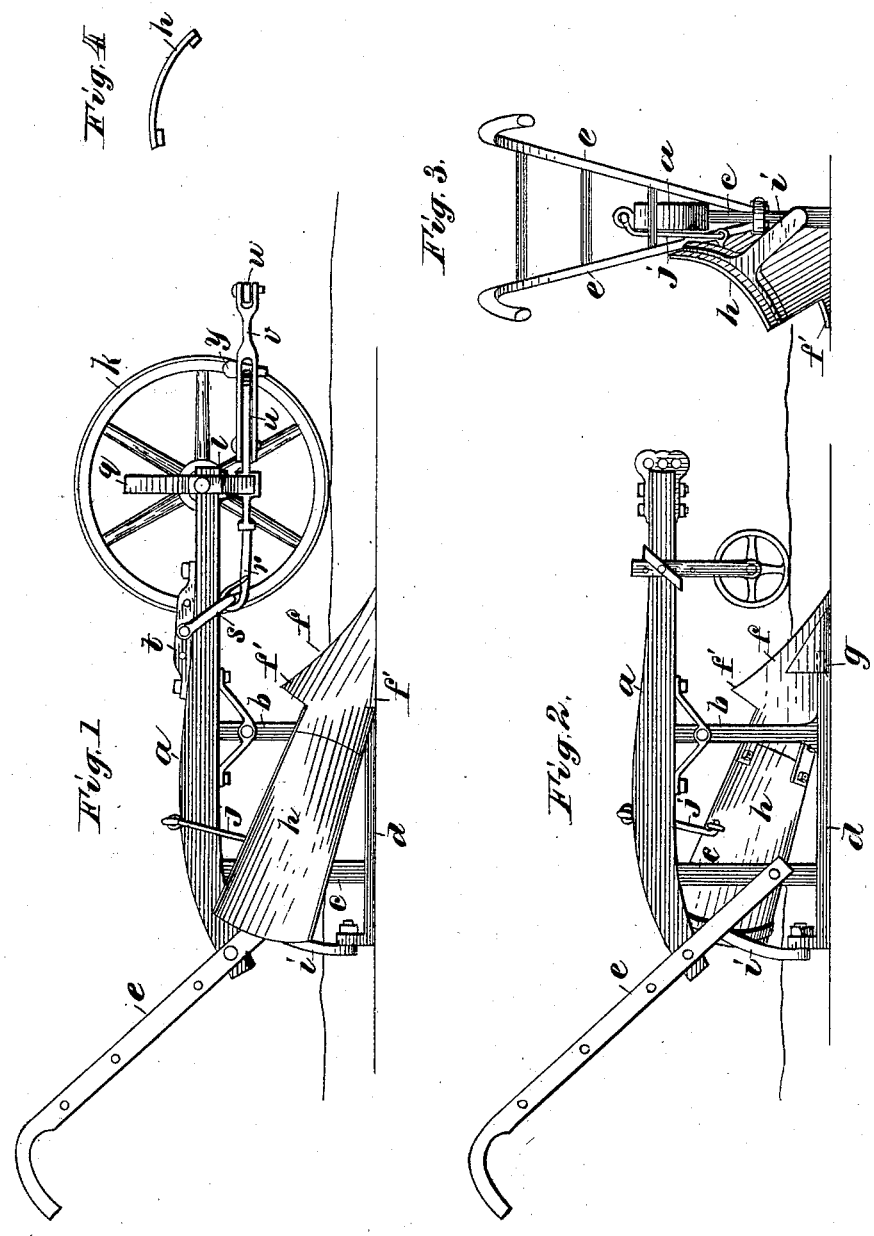

J. STOLL.
PLOW.

No. 324,607. Patented Aug. 18, 1885.

Witnesses
G. M. Gridley
M. J. Skinner

Inventor
Jacob Stoll
By Ernest Benedict
Attorneys

UNITED STATES PATENT OFFICE.

JACOB STOLL, OF MILWAUKEE, WISCONSIN, ASSIGNOR OF ONE-THIRD TO GOTTFRED RADDATZ, OF SAME PLACE.

PLOW.

SPECIFICATION forming part of Letters Patent No. 324,607, dated August 18, 1885.

Application filed April 29, 1885. (No model.)

*To all whom it may concern:*

Be it known that I, JACOB STOLL, of Milwaukee, in the county of Milwaukee and State of Wisconsin, have invented new and useful Improvements in Plows; and I do hereby declare the following to be a full, clear, and exact description of said invention, reference being had to the accompanying drawings, and to the letters or figures of reference marked thereon, which form a part of this specification.

My invention, to be hereinafter distinctly claimed, relates to plows and the mechanism for operating them.

Figure 5:
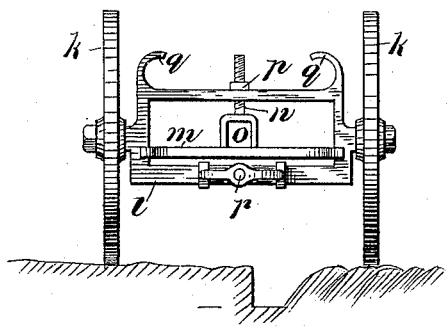

In the accompanying drawings, Figure 1 is a view of the plow and mechanism on share side, one wheel being omitted to show the other parts more fully. Fig. 2 is a view of the plow on the land side. Fig. 3 is a rear view of the plow. Fig. 4 is a view of the front end of the mold-board. Fig. 5 is a rear view of the carriage part of the device, and Fig. 6 is a top view of the carriage, a part of the axle being omitted to show cross-bar.

The same letters refer to like parts in all the views.

The frame of the plow consists of the beam $a$, two or more arms or standards, $b$ and $c$, rigid to the beam $a$ and extending downwardly therefrom, the landside $d$, rigid to the lower ends of the arms $b$ and $c$, and the handles $e\ e$, rigid to the rear arm, $c$, and to the rear end of the beam $a$. The share $f$ is provided on each edge with a sharp outwardly-extending fin, $f'$, adapted especially for cutting sod or other tenacious earth. Said share is sharp at its front point, and is on the outside slightly concave a little back from the point, and then changes its form to convex on the outside, being at its rear end where the mold-board is attached in the convex form shown in Fig. 4. In this share, on the under side, is a socket, $g$, into which the front end of the landside $d$ enters and on which the share swings. At the rear end the share is rigidly affixed to the mold-board by cleats bolted thereto, or other equivalent means. The mold-board $h$ is convex on its outside at its front end, as shown in Fig. 4, but to the rear thereof the form changes to concave on the outside. At its rear end the mold-board is supported by an arm, $i$, rigid thereto on the under or in side, which arm at its inner end is pivoted on the rear end of the landside $d$. The mold-board and share, being rigid to each other and being pivoted to the landside at the front and rear ends thereof, are adapted to be used on either side of the plow-frame, being capable of being readily swung under the frame from one side to the other, and being held in position on either side by a hook, $j$, attached to the beam $a$ and hooking into the mold-board or into an eye therein rigid on the under side of the mold-board.

Figure 6:
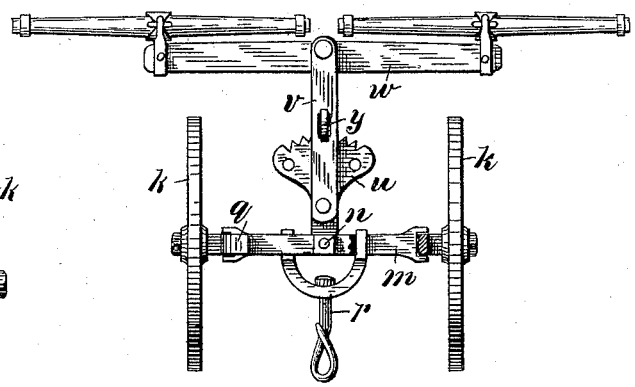

This plow may be used in the form shown in Fig. 2, with the ordinary clevis, without a carriage; but I prefer to use therewith and as a part thereof, for obtaining the full efficiency of the plow, the carriage shown in Figs. 1, 5, and 6. To this end I provide a carriage with two wheels, $k\ k$, revolving on the ends of a branching or slotted axle, $l$, said axle being constructed with a vertically-widened portion between the wheels, in which widened part is a slot, the vertical sides of which serve as guides for a vertically-moving rod or bar, $m$, which bar $m$ is provided with a rigid upwardly-extending arm, $n$, the lower part of which is bifurcate, forming with the bar $m$ an aperture, $o$, adapted to receive and control the front end of the beam $a$, and the upper part of which arm $n$ is screw-threaded and passes freely through the top part of the axle $l$, and is provided with a nut, $p$, fitted thereon above and resting on said axle, whereby said bar $m$ may be raised or lowered, as desired.

From the top of the widened part of said axle project upwardly, at a little distance from each other, two inwardly-curving guides or fingers $q\ q$, adapted to receive and guide the reins passing from the horses to the hands of the driver.

Attached to the rear of the axle $l$ by a swivel is a rearwardly-extending hook, $r$, adapted to take into the clevis $s$. The clevis $s$ is bolted and thereby pivoted into a block, $t$, rigidly affixed to the top of the beam $a$, and is provided longitudinally with a series of lateral apertures for the reception of the clevis-bolt, whereby the plow may be adjusted nearer to or farther from the carriage, as desired.

Attached to and projecting to the front from the axle is a short tongue, $u$, terminating at its front extremity in a laterally-expanding fan-shape end provided with a series of notches along its front curved segmental face. To attach the whiffletrees to this tongue $u$, I provide the short removable tongue or coupling pole $v$, having its ends slotted laterally for the reception at one end of the fan-shaped extremity of the tongue $u$ and at the other end for the reception of the evener or double-tree $w$ between the bifurcate ends of said coupling-pole. This coupling-pole is pivoted at one end to said tongue and at the other end to said double-tree by suitable bolts through apertures provided therefor in said parts respectively. Through said coupling-pole vertically, just at the front end of said tongue $u$, is a slot, in which a key, $y$, fitting into said slot and into the notches on the front end of the tongue $u$, is placed, and by removing said key and swinging said coupler around to right or left and replacing the key $y$ the line of draft of said plow may be thrown to right or left, thereby increasing or diminishing the width of cut of the plow, as desired.

It is obvious that this plow, while turning over the ground to the right in going in one direction, will, by changing the share and mold-board to the other side of the frame, turn the ground over to the left while going in the other direction, thus providing for plowing constantly along the same side of the unplowed land and turning the ground away from the unplowed land while the plow travels in either direction.

The width of the cut is readily regulated by inserting the key $y$ in such one of the notches in tongue $u$ as experience shows to be the proper one to secure the desired width of the cut. The desired depth of furrow can be secured by raising or lowering the front end of the beam $a$ by turning the nut $p$.

What I claim as new, and desire to secure by Letters Patent, is—

1. In reversible plows, the share and mold-board rigid together, the sharp cutting-fins $f'f'$ rigid to the share, and the share and mold-board together having an outer surface which on the line of their axis from front to rear laterally is concave near the point of the share, then at and near the line of junction of the share to the mold-board is convex, and at the rear is concave, substantially as described.

2. The plow-beam $a$, the thereto rigidly affixed block $t$, provided with lateral apertures for receiving the clevis-bolt, the clevis $s$, attached to the plow-beam through block $t$, and the hook $r$, attached to the axle $l$ and adapted to engage the clevis $s$, in combination with the carriage axle $l$, the tongue $u$, rigidly affixed to axle $l$, provided with notches on its curved segmental front end, the bifurcate coupling-bar $v$, pivoted at its rear end to the tongue $u$, and the key $y$, fitting into a vertical slot in coupling-bar $v$ and into one of the notches in the front end of tongue $u$, substantially as and for the purpose described.

In testimony whereof I affix my signature in presence of two witnesses.

JACOB STOLL.

Witnesses:
    C. T. BENEDICT,
    GOTTFRIED RADDATZ.